United States Patent [19]

Grassano

[11] Patent Number: 4,488,511
[45] Date of Patent: Dec. 18, 1984

[54] SHOCK-ABSORBENT LEASH FOR ANIMALS

[76] Inventor: Vincent R. Grassano, 41 Ridge Rd., Media, Pa. 19063

[21] Appl. No.: 473,045

[22] Filed: Mar. 7, 1983

[51] Int. Cl.³ .............................................. A01K 27/00
[52] U.S. Cl. ...................................... 119/109; 119/96; 267/70
[58] Field of Search ..................... 119/109, 96; 267/70, 267/73, 69

[56] References Cited

U.S. PATENT DOCUMENTS

| 197,615 | 11/1877 | Dawson | 267/70 |
| 198,275 | 12/1877 | Chase | 267/70 |
| 1,194,417 | 8/1916 | Pelham | 119/109 |
| 2,593,940 | 4/1952 | Van Meter | 119/109 |
| 2,712,932 | 7/1955 | Gould | 267/70 |

FOREIGN PATENT DOCUMENTS

| 2402614 | 7/1975 | Fed. Rep. of Germany | 119/109 |
| 367046 | 2/1932 | United Kingdom | 119/109 |

Primary Examiner—Jay N. Eskovitz
Attorney, Agent, or Firm—Harding, Earley, Follmer & Frailey

[57] ABSTRACT

The invention provides a manually held leash, lead, line or the like for large and strong animals which incorporates a shock absorbing device for diminishing the effect of the force or strain transmitted when the animal suddenly and forcibly pulls, lunges, bolts, jumps, etc. The shock absorber incorporates resilient shock absorbing means automatically operative to oppose the force exerted by the animal and to diminish its effect on the manually held leash. The device is constituted of a pneumatic cylinder the piston of which is connected to the animal and normally is retained in a retracted position by a compressive spring against which the animal pulls. In addition to the restraining force imposed by the spring on the piston, compressed air also may be utilized to absorb the shock of the animal's pulling force. The shock absorbent leash of the invention reduces the potential for injury to a person holding the leash, in the event the animal exerts a sudden and substantial force thereon.

13 Claims, 6 Drawing Figures

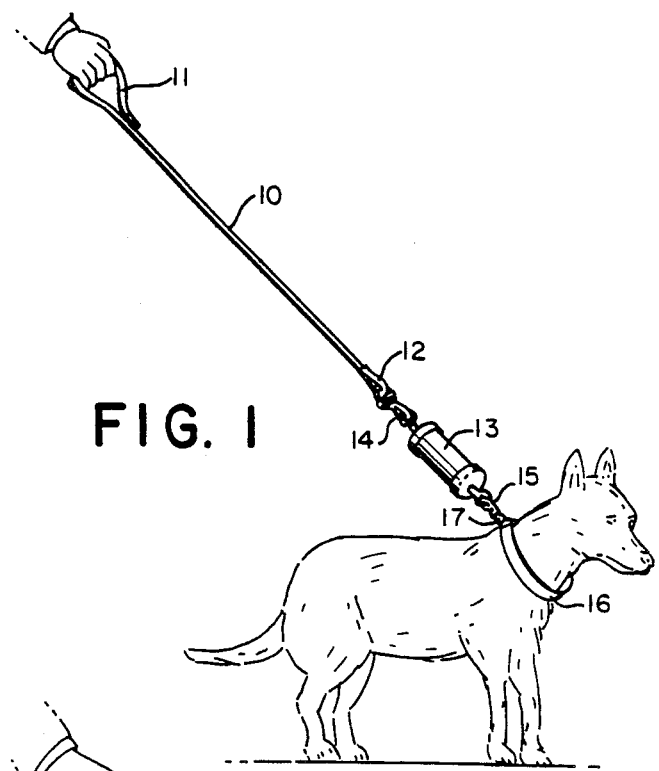
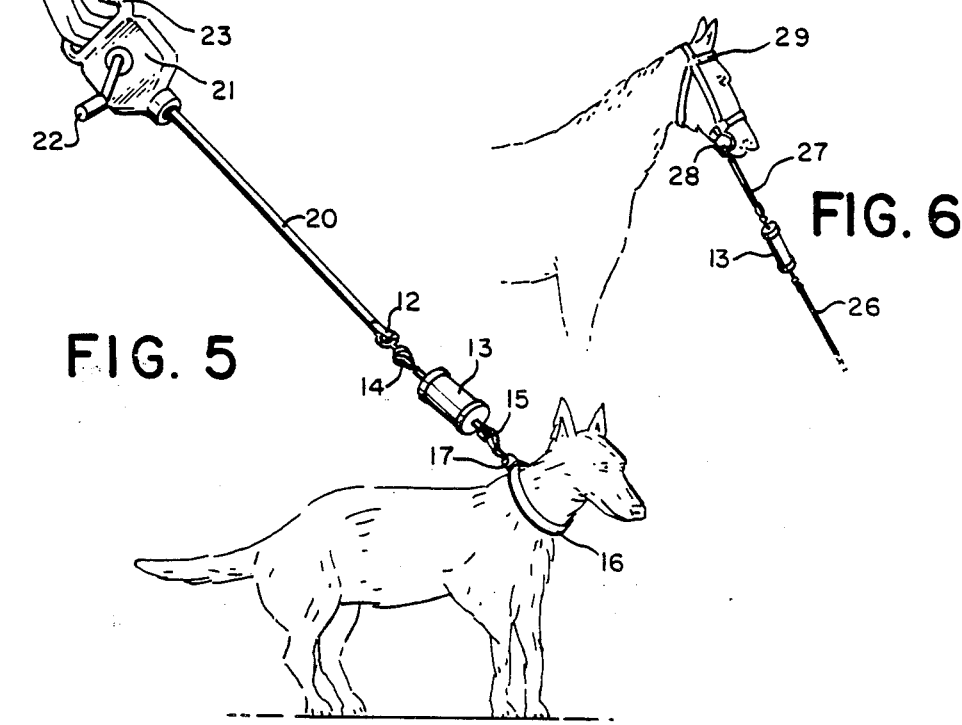

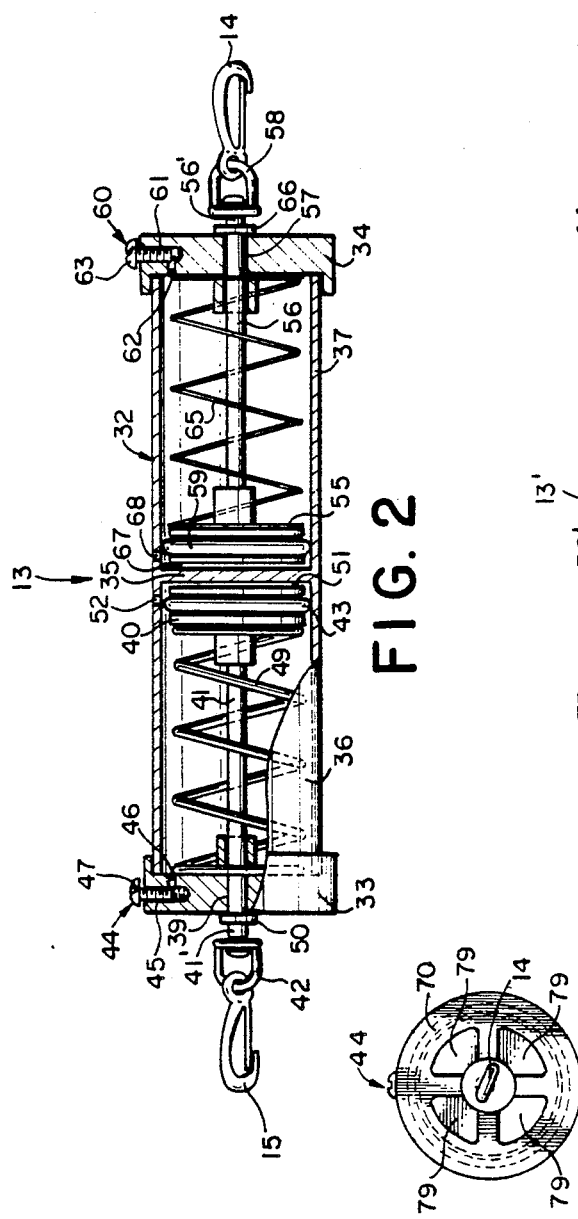
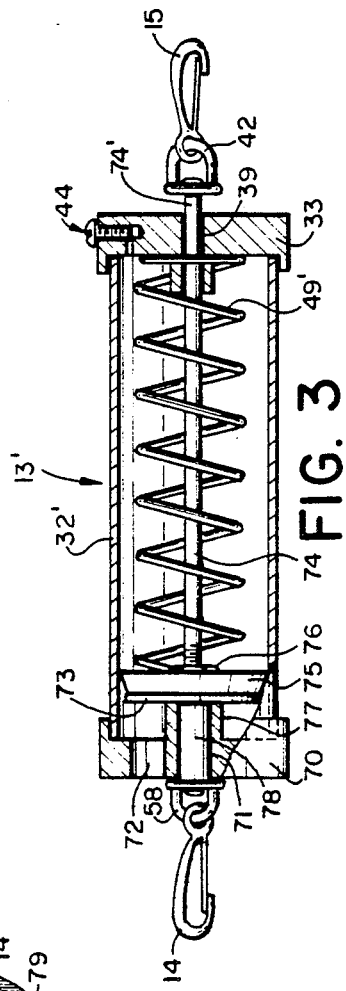

SHOCK-ABSORBENT LEASH FOR ANIMALS

BACKGROUND OF THE INVENTION

The present invention relates to an improvement in leashes, leads, lines and the like for restraining and controlling large animals, and is particularly directed to a new and improved leash for dogs.

The invention is applicable to manually held leashes, leads or lines used when walking or exercising large animals, such as a horse or a large dog, which may tug vigorously or forcibly on the leash, or may suddenly pull, lunge or bolt, thereby severely yanking or jerking the leash. The shock of such sudden activity can be severe, and can result in painful injuries to the person holding the leash, such as hand burns, wrist or back strain, elbow tendonitis, etc. Frequently, with a particularly large and strong animal, a sudden lunge or bolt can pull the leash from the grip of the person who is walking or otherwise controlling the animal.

Numerous attempts have been made to provide flexible or expansible leashes or leads for animals, such as dogs, for absorbing the shock of a sudden pull or jerk when the animal jumps, bolts or lunges. However, such prior devices do not appear to have been very effective in practical use, and apparently have received very little, if any, widespread usage. A problem inherent in such prior flexible or extensible animal leashes is the absence of any selectively controllable shock absorbing mechanism by which, in practical use, adjustments may be made to adapt the leash to the particular rigors of use to which it is exposed, such as size, temperament and type of animal. Samples of such prior devices are illustrated by the following U.S. Pat. Nos: 1,924,596, 2,275,701, 2,337,970, 2,737,154, 2,911,947 and 3,441,005.

SUMMARY OF THE INVENTION

The primary object of this invention is to provide a new and improved shock absorbent leash, lead or line for large and strong animals which is adapted to minimize the shock or strain transmitted when the animal suddenly and forcibly lunges, bolts, jumps, etc. against the restraint imposed by the leash, lead, line, rope, etc.

A further object of the invention is to provide a novel leash for animals which incorporates a device adapted to absorb and diminish substantially the effect of the severe force which may be exerted by an animal, thereby reducing the potential for injury to the person controlling the animal.

A further object is to provide a new and improved manually held leash for animals which is adapted to absorb the resulting shock or force should the animal lunge or jump, or attempt to bolt or run, or simply pull with an excess of force, to the discomfort and possible injury of the person handling the animal.

The shock absorber of the invention is interposed between, and is connected to, the animal and a conventional leash by which the animal normally is controlled, and incorporates resilient shock absorbing means. In one preferred form, the shock absorbing device constitutes a two-part unit, each part containing selectively controllable resilient means for absorbing shock or force. The resilient means may constitute compressive coil springs, pneumatic cylinders, or a combination thereof. The individual parts of the two-part unit are operative independently of each other, and may be separately controlled by independent adjustment means. One part functions preliminarily to react to, and absorb and diminish, the initial effect of the force of the lunging or bolting animal on the leash. The other part of the two-part unit is adapted to further reduce the degree of animal force transmitted to the manually held leash. The two-part unit, in its preferred form, is a compound pneumatic cylinder, which communicates with the ambient atmosphere through selectively adjustable air valves, and is provided internally with pistons and one or more coil springs.

The shock absorbing device may constitute a single cylinder having an internally slidable piston and an internal coil spring adapted to retain the piston in a retracted position in the cylinder. The spring-biased piston is connected to the animal and is operative to oppose and absorb the force exerted by the animal on the leash should it lunge, jump or bolt. If desired, in addition to the restraining force of the spring, compressed air also may be utilized to absorb the shock of such force, whereby the cylinder and piston perform in the manner of a pneumatic dampening device or dashpot. An adjustable air valve may be utilized to control the rate of flow of atmospheric air to and from the cylinder, to control selectively its shock absorbing resilience.

Although the preferred fluid for the shock absorbing device is air, the invention contemplates the use, also, of equivalent fluids. It is within the scope of the invention to utilize hydraulic means, such as a hydraulic cylinder with suitable flow control mechanism, or a gas cylinder utilizing a gas other than atmospheric air and provided with suitable gas flow and control structure.

It also is within the scope of this invention to include in the shock absorbing device a suitable command sound, such as a recorded voice, or a bell, buzzer or the like, which is actuated under controlled circumstances, such as the imposition of a selected pulling force, and which is operative to order the animal to halt, sit or otherwise cease its troublesome activity.

So far as is presently known this invention provides, for the first time, a selectively controllable shock absorber incorporating resilient means for minimizing the shock and possible injury resulting from the sudden and excessive activity of a large and strong animal being controlled or restrained manually by means of a leash, lead or line.

DESCRIPTION OF THE FIGURES OF THE DRAWING

FIG. 1 is a view in side elevation showing a preferred embodiment of the shock absorbent leash of this invention.

FIG. 2 is an enlarged, partially sectioned view in side elevation of a preferred shock absorber of the invention.

FIG. 3 is a view similar to FIG. 2 showing a modified shock absorber.

FIG. 4 is a view of front elevation showing a second modification of the shock absorber.

FIGS. 5 and 6 illustrate other utilizations of the invention.

DETAILED DESCRIPTION OF THE PREFERRED EMBODIMENT

In FIG. 1, there is illustrated a preferred embodiment of this invention in the form of a dog leash 10 having at its upper end a loop 11 with which the leash may be grasped manually, and having at its lower end a snap fastener 12. The leash 10 may be made of any material from which such products usually are made, such as leather, rubber, plastic, chain metal, etc. Interposed between the end 12 of the leash 10 and the dog collar 16 is the shock absorber 13 of this invention. The shock absorber 13 preferably is cylindrical in configuration, and is provided with snap fasteners 14, 15 at either end. As shown, shock absorber snap fastener 14 is connected to snap fastener 12 of leash 10, while shock absorber snap fastener 15 is connected to the dog collar 16 by means of a ring 17 suitably affixed to the collar.

FIGS. 5 and 6 illustrate other preferred utilizations or modifications of the invention. In FIG. 5, there is illustrated a dog leash 20 suitably connected to the cylindrical shock absorber 13 by means of intervening snap fasteners 12, 14. The dog leash 20 of FIG. 5 is of the roll-up type and, by means of a manually rotatable handle 22, may be wound up onto a suitable reel (not shown) disposed internally of casing 21. The internal construction of casing 21, containing the wind-up reel and other relates parts, is well known and constitutes no part of this invention. Casing 21 is provided with a manual grip or handle 23.

The embodiment of FIG. 6 shows the application of this invention to a lead, rope or leash 26 for a relatively large animal, such as a horse. The lead 26 is connected, by snap fasteners or equivalent means, to the shock absorber 13 which, in turn, is suitably connected to a strap 27 secured to the ring 28 affixed to the horse's halter 29. The connections between the lead 26, shock absorber 13, strap 27 and halter ring 28 may be snap fasteners of the type illustrated in FIGS. 1 and 5.

Turning now to FIG. 2, the details of construction of the shock absorber 13 will be described. Shock absorber 13 is a two-part unit preferably comprising an elongated double air cylinder 32 provided with a front end cap or wall 33 and a rear end cap or wall 34. The interior of the compound cylinder 32 is provided with a centrally disposed, transverse, impervious internal wall 35 to divide the device into a front air cylinder portion 36 and a rear air cylinder portion 37.

Slidably disposed within the front cylinder 36 is a piston 40 having an axially disposed cylindrical rod 41 affixed thereto. Piston rod 41 extends forwardly of the cylinder 36, and passes through an axial bore 39 formed in the front end cap 33. Piston rod 41 is snugly engaged in fluid-tight relationship with the interior annular wall of bore 39, and is axially slidable relative thereto. Suitably disposed on the external end 41' of the piston rod 41 is a swivel 42, to which is attached the snap fastener 15 connected to the animal as illustrated in FIG. 1. Suitably mounted on the piston 40 is a piston ring 43, preferably in the form of an O-ring.

Flow of air from the ambient atmosphere to and from the interior of the cylinder 36 is controlled by means of a selectively adjustable, screw-type air valve 44. The air valve 44 consists of a threaded hole 45 drilled in the front end cap 33, a conduit 46 by which hole 45 communicates with the interior of piston 36 and a threaded screw 47 selectively engageable threadingly internally of the hole 45. As will be understood by those skilled in the art, the rate at which air is permitted to flow into, or be discharged from, the interior of cylinder 36 is governed selectively by adjusting the position of screw 47 in threaded hole 45 relative to conduit 46.

Freely disposed around the piston rod 41, internally of the cylinder 36, is a coil spring 49 which extends the full distance between the inner surface of the front end cap 33 and the opposing or opposite surface of the piston 40. The compressive force of springs 49 urges the piston 40 inwardly of cylinder 39, in the direction of the interior cylinder wall 35, to the extent permitted by the annular flange 50 formed on the external portion 41' of the piston rod 41. Flange 50 on piston rod 41 functions as a stop, to limit the extent to which spring 49 causes piston 40 to be retracted into cylinder 36. Flange 50 limits the inward displacement of the piston 40 so that, when the piston is in its innermost position, a small gap 51 is formed between the opposing faces of the piston 40 and the internal wall 35. A port 52 in the wall of cylinder 36 permits the gap 51, formed by the axially spaced, opposing surfaces of the piston 40 and transverse wall 35, to communicate with the ambient atmosphere.

The construction of rear cylinder 37 and its associated parts is essentially identical to that of front cylinder 36. Slidably disposed in cylinder 37 is piston 55 having piston rod 56 extending through axial bore 57 in the rear end plate 34 of the compound pneumatic cylinder 32. Piston 55 is provided with an O-ring 59, and the outer end of piston rod 56' is provided with a swivel 58 to which is affixed the snap fastener 14 connected to dog leash 10, as indicated in FIG. 1.

Cylinder 37 is provided with an adjustable air valve 60 composed of threaded hole 61 formed in the rear end cap 34, conduit 62 interposed between the interior of rear cylinder 37 and hole 61 and threaded screw 63 engaged threadingly in the hole 61 with capacity for selective adjustment to control the rate of flow of air into and out of cylinder 37.

Disposed internally of the rear cylinder 37, about the piston rod 56, is a coil spring 65. The spring 65 extends between the opposing faces of piston 55 and rear end cap 34, and functions to urge the piston 55 inwardly of the cylinder 37 to the extent permitted to the annular stop or flange 66 on piston rod 56. The small gap 67 formed between the spaced opposing surfaces of the interior cylinder wall 35 and the back of the piston 55 is exposed to the ambient atmosphere by means of port 68.

As will be understood, the springs 49, 65 yieldingly oppose the advance of the pistons 40, 55 in their cylinders 36, 37 when a pulling force is exerted on the piston rods 41, 56. Preferably, the internal coil spring 49 is a stronger, more resistant spring than coil spring 65. The springs 49, 65 may be conventional compression springs of helical configuration constituted of steel or other appropriate metallic composition. If the ratio strength between the two springs is 2:1, for example, the springs 49, 65 may comprise, respectively, 20 pound and 10 pound compressive stainless steel springs. Of course, it is within the scope of the invention to reverse the arrangement of springs illustrated in FIG. 2, and dispose the lighter spring 65 internally of cylinder 36, and dispose the heavier spring 49 internally of cylinder 37.

In practice, the strength of the lighter spring 65 may be such that, upon the jolting or lunging pull of an animal, spring 65 is fully compressed, and its piston 55 is fully advanced, before any movement is imparted to piston 40 against the heavier spring 49. In such arrangement, the yielding resistance of the spring 65 would be fully depleted, by the pull of the animal, before the yielding resistance of spring 49 becomes effective. However, the relative strength of the two springs 65, 49 is a matter of selected design. For example, the relative strength of the two springs 65, 49 may be such that, after spring 65 is partially compressed, for example to the extent required to permit piston 55 to advance 60% of its full stroke within cylinder 37, piston 40 then may commence to advance against the yielding resistance of its spring 49.

However, the ratio of forces required to displace the two pistons outwardly relative to their cylinders need not be governed solely by the relative strength of the two springs 49, 65. Selective adjustment of the air valves 44, 60 also may be utilized to influence or control the forces required to advance the pistons 40, 55 relative to their respective cylinder 36, 37. For example, by adjusting air valve 44 to reduce the rate of discharge of air from within the cylinder 36, the internal air pressure acting on the piston 40, as it is pulled or caused to advance within cylinder 36, is increased. Such increase in air pressure retards the advance of the piston 40, and increases, in proportion, the force required to move it.

As will be understood, by selectively adjusting the valves 44, 60, whereby air discharges from cylinder 36 at a relative slow rate as piston 40 is advanced, whereas air escapes from cylinder 37 at a relatively rapid rate as piston 55 is advanced, a selectively larger force must be exerted on piston rod 41 to advance piston 40 in comparison to force required to be exerted on piston rod 56 in order to advance piston 55. Thus, like the springs 49, 65, the selectively controlled compressed air in the cylinders 36, 37 functions as a resilient means yieldingly opposing the advance of the piston 40, 55 when pulling forces are exerted on the piston rods 41, 56.

When the shock absorber 13 is utilized in the manner illustrated in FIGS. 1, 5 and 6, it constitutes a part or extension of the leash, lead or line by which the animal is manually held, restrained or controlled, as when walking a dog or exercising a horse. Snap fastener 15 connects the front pneumatic cylinder 36 of the shock absorber 13 to the animal, and snap fastener 14 connects the rear pneumatic cylinder 37 to the manually held leashes 10, 20, 26. If the animal pulls severely on its leash, or lunges, bolts or jumps, the resulting force is transmitted to, and absorbed and diminished controllably by, the shock absorber 13.

Since the resilient forces yieldingly opposing piston 55 are less than those opposing piston 40, the pulling force of the animal initially causes piston 55 to advance against spring 65 and the compressed air in cylinder 37 discharging therefrom at a controlled rate through the adjustable air valve 60. The combined resilient forces in the cylinder 37 absorb and diminish the initial effect of the force or pull exerted by the animal by yieldingly opposing, and thus retarding, the advance of the piston 55 relative to its cylinder 37. Thus, pneumatic cylinder 37 and its associated parts function to reduce controllably the initial effect of the pulling force of the animal transmitted linearly through the shock absorber 13 to the leashes 10, 20, 26.

Pneumatic cylinder 36 and its associated parts are operative to supplement the shock absorbing function of pneumatic cylinder 37. For example, where the pulling force of the animal is excessive, and overcomes the initial resistance provided by the cylinder 37 and its associated parts, or where the pulling force of the animal continues for a sustained period, piston 40 will be caused to advance against the yielding, resilient forces exerted by the spring 49 and the compressed air, under the control of air valve 44, in cylinder 46. In the manner explained previously, the resilient forces exerted yieldingly on piston 40 will further absorb and reduce the animal's pulling force transmitted to the manually held leash. Thus, by reason of its two shock absorbing units 36, 37 operating in the manner described, shock absorber 13 functions to substantially reduce the possibility of serious injury to a person holding the leashes 10, 20, 26.

If desired, in the practice of the invention one or both of the coil springs 49, 65 may be eliminated, and the resilient force yieldingly exerted on the pistons 40, 55 may be provided solely by the selectively controlled air pressures in the cylinder 36, 37, suitably controlled by the adjustable air valves 44, 60. For example, spring 65 may be eliminated from within the pneumatic cylinder 37, and selectively controlled compressed air may be utilized as the sole yieldable force for retarding the advance of the piston 55 in response to animal pulling force exerted on the piston.

The component parts of the shock absorber 13 may be made of any suitable strong, rigid and lightweight materials, such as aluminum, stainless steel or moldable plastics, such as polypropylene, high impact polystyrene, nylon, etc. The snap fasteners 14, 15, swivels 42, 58, piston rods 41, 56 and pistons 40, 55 may be composed of metal. The O-rings 43, 59 may be made of a suitable non-metallic material such as the plastic known in the trade as "Teflon".

FIG. 3 illustrates a modified shock absorber 13' comprising an elongated pneumatic cylinder 32' provided with the front end cap or wall 33 and a rear end cap or wall 70. The front end cap 33 shown in FIG. 3 is identical in construction to front end cap 33 of FIG. 2, and includes the same axial bore 39 and adjustable air valve 44.

Slidably disposed within cylinder 32' is a piston 73 having an axially extending cylindrical rod 74 affixed thereto. Piston rod 74 extends forwardly of the cylinder 32', and passes through the axial bore 39 in the front end cap 33, and terminates in an external end 74' on which is mounted the swivel 42. Piston rod 74 is snugly engaged in fluid-tight relationship with the interior annular wall of bore 39, and is axially slidable relative thereto. The piston 73 includes a flexible cup 75 which flares outwardly into fluid-tight contact with the inner surface of the cylinder 32'. The flexible cup 75 is of conventional design, and is tightly secured to the piston 73 by means of a threaded nut 76 engaged threadingly on the inner end of the piston rod 74. To ensure its fluid-tight relationship with the cylinder 32', the flexible cup preferably is made of rubber or neoprene.

The compressive force of the coil spring 49' urges the piston 73 inwardly of the cylinder 32', in the direction of the rear end cap 70. A boss 77 formed on the inner surface of rear end cap 70, and extending a short distance into the hollow of cylinder 32', functions as a stop and limits the extent to which spring 49' causes piston 73 to be retracted into the cylinder 32'. The interior of the rear portion of the cylinder 32', disposed between end cap 70 and the piston 73, is in open communication with the ambient atmosphere by means of air conduit 72 in the end cap 70.

An axially extending hole or aperture 71 formed in the rear end cap 70 is adapted to retain the inner end of an axially extending rod 78, to the outer end of which is affixed the swivel 58. Preferably, the inner end of rod 78 is force fitted into the hole 71 which, as illustrated in FIG. 3, may extend internally of the boss 77.

In operation, pneumatic cylinder 32' and its associated parts function in a manner generally similar to the operation described in respect to pneumatic cylinders 36, 37. When an animal pulls excessively, or lunges, bolts or jumps, its pulling force is transmitted through snap fastener 15, swivel 42 and piston rod 74 to piston 73, which is caused to advance against the resilient, yielding forces exerted by coil spring 49' and the compressed air internally of cylinder 32' under the control of the adjustable air valve 44. Thus, shock absorber 13' functions to counteract, absorb and diminish the effect or shock of the pulling force of the animal as it is transmitted through the shock absorber, rod 78, swivel 58 and snap fastener 14 to the manually held leashes 10, 20, 26. As will be understood, when the pulling force of the animal diminishes, spring 49' is operative to retract the piston 73 rearwardly of the cylinder 32' to the position illustrated in FIG. 3. As the piston 73 is retracted, air flows into the forward portion of the cylinder 32', via the air valve 44, and discharges from the rear portion of the cylinder via conduit 72.

The modification of the shock absorber 13' illustrated in FIG. 4 differs from the construction illustrated in FIG. 3 only in that the air conduit 72 formed in the rear wall 70 is replaced by a plurality of openings or holes 79 by which the rear portion of the hollow of the cylinder 32', disposed rearwardly of the piston 73, communicates with the ambient atmosphere.

Although preferred embodiments of this invention have been disclosed and described in detail for the purpose of illustration, in compliance with Title 35 U.S.C. §112, it will be understood that the invention may find expression in alternate embodiments thereof, and that various changes and modifications may be made to the embodiments illustrated without departing from the spirit of the invention or the scope thereof as set forth in the claims.

For example, in operation the modified shock absorber 13' of FIGS. 3 and 4 may be reversed in use, whereby snap fastener 14 may be attached to the animal and snap fastener 15 may be attached to the leashes 10, 20, 26. Also, the invention is fully applicable to, and very useful in connection with, dog runs where the animal is connected by a suitable lead, line or leash to an overhead trolley or to a ground swivel. The incorporation of the shock absorbent device of this invention, such as shock absorbers 13, 13', into such a lead, line or leash has the highly beneficial effect of reducing possible injury to the animal should it lunge, jump or bolt, or pull severely on such a non-manually held leash.

I claim:

1. In an animal leash having a manual grip at one end and a fastening means at its opposite end for attachment to an animal, a device for absorbing shock resulting from pull of the animal on the leash comprising
    (a) a hollow cylinder including a piston disposed slidably therein,
    (b) a cylinder end cap,
    (c) a piston rod connected to the piston and extending through the end cap outwardly of the cylinder,
    (d) connection means for connecting the leash to the cylinder externally of the cylinder, whereby force from the pull of the animal is transmitted to the piston to cause the piston to advance in the cylinder,
    (e) air conduit means in the end cap for connecting the interior of the cylinder to the ambient atmosphere and
    (f) and adjustable valve located in the air conduit means, said valve being operative to regulate the rate of flow of air from the cylinder to control selectively compression of air within the cylinder upon advancement of the piston,
    (g) said compressed air in the cylinder functioning as resilient means yieldingly resisting the advance of the piston.

2. The leash of claim 1, further including resilient means comprising a spring extending between the piston and the end cap.

3. The leash of claim 1 constituted of a manually holdable lead and the shock absorbing device, further including
    (a) a transverse wall located internally of the hollow cylinder to divide the cylinder into a front cylinder and rear cylinder, said front and rear cylinders each having an outer end and an inner end adjacent the transverse wall,
    (b) a piston disposed slidably in each cylinder,
    (c) a piston rod connected to each piston and extending outwardly of each cylinder beyond its outer end,
    (d) a first connection means including the fastening means for connecting one piston rod to an animal and
    (e) a second connection means for connecting the other piston rod to the lead.

4. The leash of claim 3, wherein each cylinder has
    (a) an end cap disposed at its outer end and
    (b) a spring extending between its piston and its end cap.

5. The leash of claim 3, further including
    (a) an end cap disposed at the outer end of each cylinder,
    (b) air conduit means in each end cap connecting the interior of each cylinder to the ambient atmosphere and
    (c) an adjustable valve located in each air conduit means, said valves being operative to regulate the rate of discharge of air from the cylinders upon advancement of the pistons in the cylinders in response to the pull of the animal on the leash.

6. The leash of claim 5, wherein
    the adjustable valves are operative to control selectively compression of the air in the cylinders upon advancement of the pistons.

7. The leash of claim 3, further including
    (a) end caps covering the outer ends of each cylinder,
    (b) an aperture in each end cap through which one of the piston rods extend and
    (c) a spring disposed in each cylinder between the piston and the end cap of each said cylinder,
    (d) said springs being operative to retract the pistons from the end caps inwardly of their respective cylinders and to yieldingly resist advancement of the pistons towards the end caps of their respective cylinders in response to the pulling force of the animal on the leash.

8. The leash of claim 7, wherein said springs are on unequal strength.

9. A shock absorbent device for incorporation into a leash, line or lead for controlling, retaining or restraining an animal, said device being disposed intermediate the leash, lead or line and the animal for absorbing shock resulting from the pull of the animal, comprising
    (a) a hollow cylinder having a piston disposed slidably therein, said cylinder having a front end proximate the animal and a rear end proximate the leash, line or lead, (b) a piston rod connected to the piston and extending outwardly from one end of the cylinder, (c) connection means mounted adjacent each end of the cylinder for connecting the cylinder to the animal and to the leash, lead or line, one said connection means being affixed to the piston rod externally of the cylinder, whereby force from the pull of the animal is transmitted to the piston to cause the piston to advance in the cylinder, (d) a cylinder end cap having an aperture through which the piston rod extends externally of the cylinder, (e) air conduit means in the end cap for connecting the interior of the cylinder to the ambient atmosphere and (f) adjustment means located in the air conduit means, said adjustment means being operative to regulate selectively the rate of discharge of air from the cylinder upon advancement of the piston, (g) whereby compression of the air within the cylinder may be controlled selectively as the piston advances, said compressed air in the cylinder functioning as resilient means yieldingly resisting the advance of the piston.

10. The shock absorbent device of claim 9, wherein (a) the hollow cylinder is constituted of a front cylinder and rear cylinder, said front and rear cylinders each having an outer end, (b) a piston is disposed slidably in each cylinder, (c) a piston rod is connected to each piston and extends outwardly of each cylinder beyond its outer end, (d) the connection means are mounted on said piston rods externally of the cylinders and (e) a spring is disposed in each cylinder between the piston and the outer end of each cylinder for yieldingly resisting the advance of the pistons in the cylinders under the influence of force resulting from pull of the animal.

11. A shock absorber for an animal leash for absorbing shock resulting from pull of the animal on the leash, comprising (a) a hollow double cylinder, (b) a transverse wall located internally of the double cylinder to divide said cylinder into a single front cylinder and a single rear cylinder, said single cylinders each having outer ends, (c) an end wall disposed at the outer end of each single cylinder, (d) a piston disposed slidably in each single cylinder, (e) a piston rod connected to each piston and extending outwardly of each single cylinder through the end wall thereof, (f) connection means mounted on each of the piston rods externally of the double cylinder for connecting said cylinder to the animal and to the leash, whereby force from the pull of the animal is transmitted to the pistons to cause the pistons to advance in their respective single cylinders, (g) air conduits in each end wall connecting the interior of each single cylinder to the ambient atmosphere and (h) adjustable means located in the air conduits, said adjustment means being operative to regulate selectively the rate of discharge of air from the single cylinders upon advancement of their pistons therein, (i) whereby compression of the air within the single cylinders may be controlled selectively as said pistons advance, said compressed air in the cylinders functioning as resilient means yieldingly resisting the advance of the pistons in their respective cylinders.

12. The shock absorber of claim 11, further including a spring disposed in each single cylinder between the piston and the end wall of each said cylinder, said springs being operative to retract the pistons from the end walls inwardly of their respective single cylinders and to yieldingly resist advancement of the pistons toward the end walls of their respective cylinders in response to the pulling force of the animal on the leash.

13. The shock absorber of claim 12, wherein the springs are of an unequal strength.

* * * * *